United States Patent
Marupaduga

(10) Patent No.: US 11,659,536 B1
(45) Date of Patent: May 23, 2023

(54) CONTROLLING CARRIER LOAD BASED ON DISTRIBUTION OF SECONDARY UE CONNECTIONS

(71) Applicant: Sprint Spectrum L.P., Overland Park, KS (US)

(72) Inventor: Sreekar Marupaduga, Overland Park, KS (US)

(73) Assignee: Sprint Spectrum LLC, Overland Park, KS (US)

( * ) Notice: Subject to any disclaimer, the term of this patent is extended or adjusted under 35 U.S.C. 154(b) by 0 days.

(21) Appl. No.: 17/653,784

(22) Filed: Mar. 7, 2022

Related U.S. Application Data

(62) Division of application No. 16/948,705, filed on Sep. 29, 2020, now Pat. No. 11,297,619.

(51) Int. Cl.
  *H04W 72/04* (2023.01)
  *H04W 72/0453* (2023.01)
  *H04W 76/15* (2018.01)
  *H04W 72/51* (2023.01)
  *H04W 72/52* (2023.01)

(52) U.S. Cl.
  CPC ....... *H04W 72/0453* (2013.01); *H04W 72/51* (2023.01); *H04W 72/52* (2023.01); *H04W 76/15* (2018.02)

(58) Field of Classification Search
  CPC ............... H04W 72/04; H04W 72/044; H04W 72/0453; H04W 72/048; H04W 72/0486; H04W 76/15
  See application file for complete search history.

(56) References Cited

U.S. PATENT DOCUMENTS

| | | | |
|---|---|---|---|
| 2021/0022073 A1* | 1/2021 | Kwok | H04W 72/085 |
| 2021/0084536 A1* | 3/2021 | Chou | H04W 36/08 |
| 2021/0219204 A1* | 7/2021 | Shi | H04W 24/08 |
| 2021/0266753 A1* | 8/2021 | Kumar | H04W 76/16 |

* cited by examiner

*Primary Examiner* — Siu M Lee
(74) *Attorney, Agent, or Firm* — McDonnell Boehnen Hulbert & Berghoff LLP

(57) ABSTRACT

A method and system for controlling carrier load in a wireless communication system that supports multiple user equipment devices (UEs) each being primarily connected with a first access node on a first carrier and each having a respective secondary connection for dual-connectivity service. An example method includes (i) monitoring a distribution of the respective secondary connections of the UEs among being on a second carrier and being on a third carrier, the third carrier having wider bandwidth than the second carrier, (ii) based on the monitoring, determining that at least a predefined threshold portion of the UEs have their secondary connections on the third carrier rather than on the second carrier, and (iii) based at least on the determining, taking action to control load on the first carrier, such as limiting a maximum number of UEs allowed to be concurrently connected with the first access node on the first carrier.

19 Claims, 5 Drawing Sheets

OF MULTIPLE UEs PRIMARILY CONNECTED WITH A FIRST ACCESS NODE ON A FIRST CARRIER, DETERMINE HOW MANY OF THE UEs' RESPECTIVE SECONDARY CONNECTIONS HAVE AT LEAST PREDEFINED THRESHOLD WIDE FREQUENCY BANDWIDTH

46

BASED AT LEAST ON THE DETERMINATION, TAKE ACTION TO CONTROL LOAD ON THE FIRST CARRIER

48

CONTROLLING CARRIER LOAD BASED ON DISTRIBUTION OF SECONDARY UE CONNECTIONS

REFERENCE TO RELATED APPLICATION

This is a divisional of U.S. patent application Ser. No. 16/948,705, filed Sep. 29, 2020, the entirety of which is hereby incorporated by reference.

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink, the air interface provided by an access node on a given carrier could be configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random-access signaling from UEs to the access node, and other resource elements could be reserved to carry other control signaling such as PRB-scheduling requests, acknowledgement messaging, and channel-quality reports from UEs to the access node.

OVERVIEW

When a UE enters into coverage of an example network, the UE could detect threshold strong coverage of an access node on a particular carrier (e.g., a threshold strong reference signal broadcast by the access node on that carrier) and could then engage in random-access and connection signaling, such as Radio Resource Control (RRC) signaling, with the access node to establish an RRC connection or the like through which the access node will then serve the UE on the carrier.

Further, if the UE is not already registered for service with the core network, the UE could transmit to the access node an attach request, which the access node could forward to a core-network controller for processing. And the core-network controller and access node could then coordinate setup for the UE of a bearer extending between the UE and a core-network gateway that provides transport-network connectivity, with the bearer including a data radio bearer portion extending between the UE and the access node an access-bearer portion extending between the access node and the gateway.

Once the UE is so connected and registered, the access node could then serve the UE in a connected mode on the carrier, managing downlink air-interface communication of packet data to the UE and uplink air-interface communication of packet data from the UE.

With the example air interface described above, for instance, when packet data for the UE arrives at the core network from a transport network, the data could flow over the UE's access bearer to the UE's serving access node, and the access node could then schedule and provide transmission of that data to the UE on particular downlink PRBs of the carrier. Likewise, when the UE has data to transmit on the transport network, the UE could transmit a scheduling request to the access node, the access node could responsively schedule transmission of that data from the UE on particular uplink PRBs of the carrier, and the UE could accordingly transmit the data to the access node for forwarding over the UE's access bearer and through the core network to the transport network.

When the industry advances from one generation of wireless technology to the next, or in other scenarios, networks and UEs may also support dual-connectivity service, where a UE is served on multiple co-existing connections, perhaps according to different respective RATs.

For instance, a cell site could include a first access node configured to provide service according to a first RAT and a second access node configured to provide service according to a second RAT, and a UE positioned concurrently within coverage of both the first and second access nodes could have a first radio configured to engage in service according to the first RAT and a second radio configured to engage in service according to the second RAT. With this arrangement, the UE may be able to establish a first air-interface connection with the first access node according to the first RAT and a second air-interface connection with the second access node according to the second RAT, and the access nodes may then concurrently serve the UE over those connections according to their respective RATs.

Such dual connectivity (or "non-standalone" connectivity) could help facilitate increased peak data-rate of communications, by multiplexing the UE's communications across the multiple air-interface connections. Further or alternatively, dual connectivity may provide other benefits compared with serving a UE on a single connection (as "standalone" connectivity).

In a representative dual-connectivity implementation, one of the access nodes could operate as a master node (MN), responsible for coordinating setup, management, and teardown of dual-connectivity service for the UE and functioning as an anchor point for RRC signaling and core-network control signaling related to the dual-connected UE. And each of one or more other access nodes could operate as a secondary node (SN) mainly to provide additional connectivity and increased aggregate bandwidth for the UE.

When a UE that supports dual-connectivity service enters into coverage of such a system, the UE could initially scan for and detect coverage of a first-RAT access node on a first-RAT carrier and engage in signaling to establish a first-RAT connection between the UE and that access node on that carrier as discussed above. And perhaps having determined from profile data that the UE is dual-connectivity-capable, the UE's serving access node, acting as an MN, could then engage in a process to set up dual connectivity for the UE.

In an example dual-connectivity setup process, the MN could first determine a second-RAT carrier on which to establish for the UE a second-RAT connection between the UE and the second-RAT access node that would serve as an SN. For instance, the MN might provide the UE with a "B 1" (inter-RAT) measurement object that causes the UE to scan for second-RAT coverage, and the UE may report being within threshold strong coverage of a given carrier on which the second-RAT access node operates. Further or alternatively, other second-RAT carrier selection factors could be involved.

Upon determining the second-RAT carrier on which to establish the second-RAT connection between the UE and the SN, the MN could then engage in signaling with the core-network controller, with the SN, and with the UE, to establish for the UE the second-RAT connection on that second-RAT carrier.

Further, the MN could coordinate bearer connectivity for the UE via the SN, to enable a portion of the UE's packet-data flow to be served by the MN concurrently with another portion of the UE's packet-data flow being served by the SN. Various bearer configurations are possible for this purpose.

In an example implementation, for instance, the UE's access bearer could be transferred from being between the MN and the gateway to instead being between the SN and the gateway, and a leg of the bearer could extend between the MN and the SN. That way, when the core network has data destined to the UE, that data would flow to the SN, (i) the SN could transmit a portion of the data over the UE's second-RAT connection to the UE, and (ii) the SN could send another portion of the data to the MN, which the MN would transmit over the UE's first-RAT connection to the UE. And when the UE has data to transmit, (i) the UE could transmit a portion of the data over the UE's second-RAT connection to the SN, which the SN would forward into the core network, and (ii) the UE could transmit another portion of the data over the UE's first-RAT connection to the MN, the MN could send to the SN and the SN could forward into the core network. Other bearer arrangements are possible as well.

With these first-RAT and second-RAT connections and bearer connectivity established for the UE, the MN and SN could then serve the UE with packet-data communications on their respective connections with the UE, each in the manner discussed above, for instance with a portion of data flowing over the UE's first-RAT connection between the UE and the MN concurrently with another portion of the data flowing over the UE's second-RAT connection between the UE and the SN.

With such dual connectivity, there may be a particular split-ratio that defines what percentage of the UE's data flow would be provided on the UE's first-RAT connection versus what percentage of the UE's data flow would be provided on the UE's second-RAT connection. This split ratio could apply with respect to downlink communications and/or with respect to uplink communications. And the split ratio may be set by engineering design and/or based on various factors.

With the UE's bearer configured as noted above, the SN and/or UE could implement this division of the UE's data flow, perhaps according to directives from the MN. As to the downlink, for instance, the SN could apply the split ratio to determine what percentage of the UE's downlink data flow the SN should send to the MN for transmission to the UE versus what percentage of the UE's downlink data flow the SN should transmit to the UE itself. And as to uplink, the UE could apply the split ratio to determine what percentage of the UE's uplink data flow the UE should send to the MN versus what percentage of the UE's uplink data flow the UE should send to the SN.

In practice with this arrangement, a certain percentage of the UE's total data flow would be carried between the UE and the MN on the first-RAT carrier on which the UE is connected with the MN. And the volume of the UE's data flow that would be carried on that first-RAT carrier would be proportional to the UE's total data flow, according to the split ratio. For instance, instance, if the split ratio defines a 25:75 split between the UE's first-RAT connection and second-RAT connection, then (i) if the UE's total data flow is 100 units of data, then 25 of those units would be carried on the first-RAT carrier, whereas (ii) if the UE's total data flow is 200 units of data, then 50 of those units would be carried on the first-RAT carrier.

In a typical implementation, a dual-connected UE's total data flow may also depend on the bandwidth of the UE's connections. For instance, if either or each of the UE's connections is on a particularly-wide-bandwidth carrier, that wide bandwidth may support a relatively high data flow, and so the UE's total data flow may be relatively high.

Given this example context, the present disclosure stems from a realization that, for a given first-RAT carrier, the choice of second-RAT carrier to be used for dual-connectivity service of each of various UEs could bear on the total data load on the MN's first-RAT carrier. Of the UEs that are connected with the MN on the first-RAT carrier and will be served with dual-connectivity service, if most of those UEs connect with the SN on a relatively-wide-bandwidth second-RAT carrier, then the total data load on the first-RAT carrier may be relatively high. Whereas if most of those UEs connect with the SN on a relatively-narrow-bandwidth second-RAT carrier, then the total data load on the first-RAT carrier may be relatively low.

Recognizing this interrelationship, the present disclosure provides for having a computing system dynamically work to control load on the MN's first-RAT carrier when a threshold extent of the UEs that are served with dual-connectivity and have their first-RAT connection with the MN on the first-RAT carrier have their second-RAT connection on a relatively-wide-bandwidth second-RAT carrier. The computing system here could be the MN itself and/or could be another entity such as an element management system or the like.

By way of example, consider a scenario where the SN provides coverage on two second-RAT carriers A and B, with second-RAT carrier B being substantially wider bandwidth than second-RAT carrier A. In that case, the computing system could monitor, of the UEs that are served with dual-connectivity having their first-RAT connection with the MN on the first-RAT carrier, (i) what portion of the UEs have their second-RAT connection with the SN on the narrower carrier A versus (ii) what portion of the UEs have their second-RAT connection with the SN on the wider carrier B. And responsive to at least determining that more such UEs have their second-RAT connection on the wider carrier B, the computing system could then take action to help control load on the MN's first-RAT carrier.

Other examples could be possible as well, not limited to keying the decision to a majority of the UEs having their second-RAT connection on the wider carrier B. For instance, at issue could be if at least a predefined threshold high percentage of the UEs have their second-RAT connection on the wider carrier B, among other possibilities.

The action that the computing system takes to help control load on the first-RAT carrier could in turn take various forms. By way of example, it could involve causing the MN to impose or strengthen a maximum limit on the number of UEs in total that the MN will allow to be concurrently connected on the first-RAT carrier (i.e., connected on the first-RAT carrier at the same time as each other), perhaps specifically for standalone-connectivity with the MN on that carrier or perhaps overall, including both standalone-connected UEs and dual-connected UEs. Or it could involve causing the MN to limit application of one or more resource-intensive services on the first-RAT carrier.

These as well as other aspects, advantages, and alternatives will become apparent to those of ordinary skill in the art by reading the following detailed description, with reference where appropriate to the accompanying drawings.

Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone-4G connection with a 4G eNB, and the 4G eNB could then coordinate setup of EN-DC service for the UE, including setup for the UE of a secondary 5G connection with the 5G gNB and setup of bearer connectivity for the UE. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations, including possible a single-RAT dual-connectivity arrangement. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
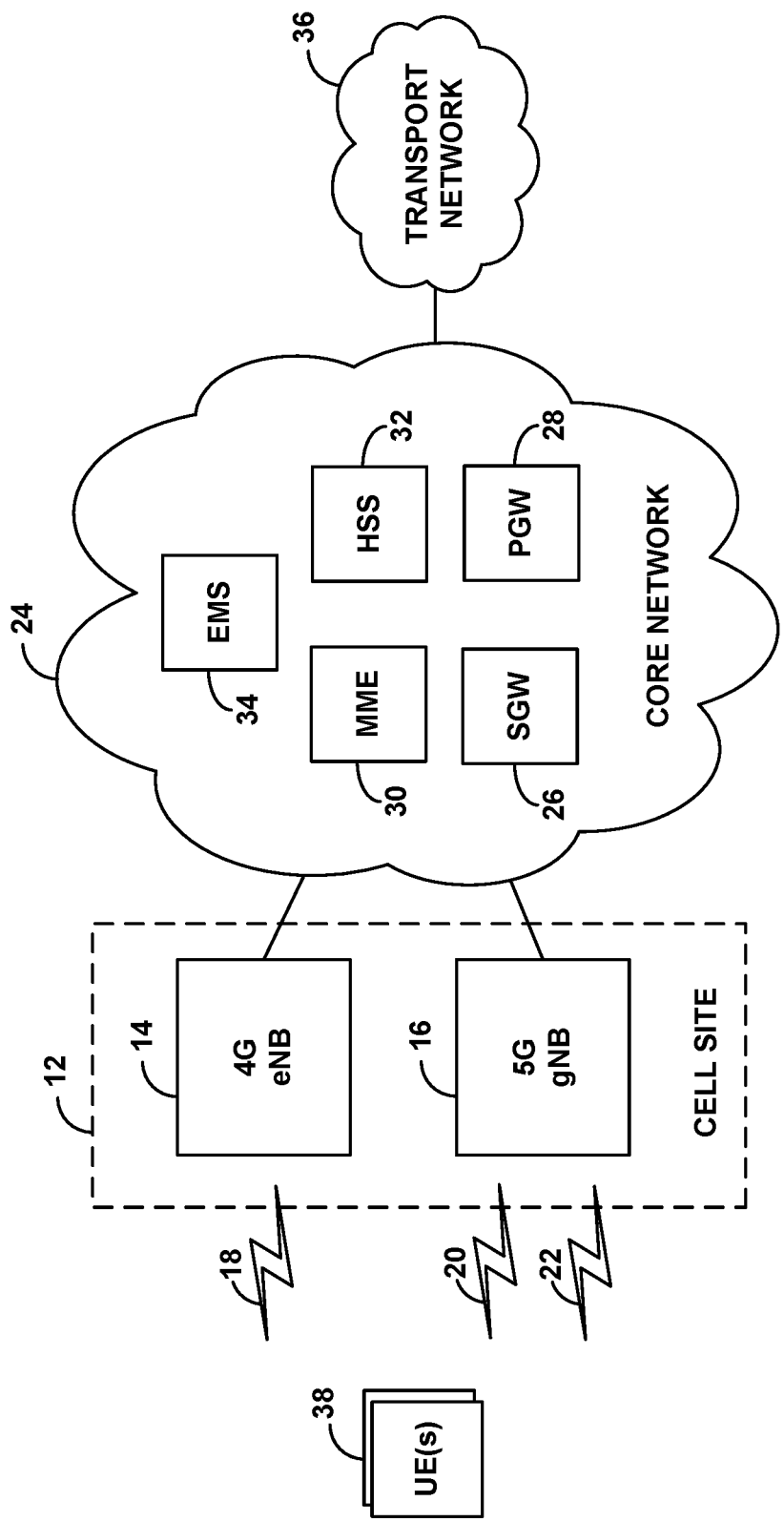
FIG. 1 is a simplified block diagram of an example network arrangement in which features of the present disclosure can be implemented.

Referring to the drawings, FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, relays, femtocell access nodes, or the like, possibly configured to provide a smaller range of coverage. And while shown as being at a common cell site, the access nodes could alternatively be separately located.

In the example arrangement illustrated, the 4G eNB 14 is configured to provide 4G coverage and service on at least one 4G carrier 18, and the 5G gNB 16 is configured to provide 5G coverage and service on at least two 5G carriers 20, 22. As discussed above, each of these carriers could have a duplex mode (i.e., TDD or FDD) and could be defined at a specific frequency position in a respective band and have a respective frequency bandwidth (e.g., as its overall bandwidth if TDD or as the bandwidth of its downlink channel or uplink channel (perhaps the same as each other) if FDD).

For present purposes, we could assume by way of example that the carriers are all TDD and that (i) 4G carrier 18 is a 20 Megahertz (MHz) wide carrier in band 41, (ii) 5G carrier 20 is another 20 MHz wide carrier in band 41, and (iii) 5G carrier 22 is a 200 MHz wide carrier in band n261. Of note in this example is that, of the two 5G carriers, carrier 22 has much wider bandwidth than carrier 20.

To facilitate providing service and coverage on the illustrated carriers, the access nodes could have a respective antenna structures, such as an antenna array, that is configured to transmit and receive electromagnetic signals in a region defined by an antenna pattern or radiation pattern, or the access nodes could share portions of a common antenna array for this purpose. And the access nodes could include other communication equipment, such as baseband units, radio heads, power amplifiers, and the like. (Further, for an access node operating on multiple different frequency bands, the access node might have a separate respective antenna structure, baseband unit, and/or other communication equipment per band.)

The air interface on each of these carriers could be structured as described above by way of example, being divided over time into frames, subframes, and symbol time segments, and over frequency into subcarriers, thus defining an array of air-interface resource elements grouped into PRBs allocable by the respective access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In the example arrangement of FIG. 1, the 4G eNB 14 and 5G gNB 16 are both interfaced with a core network 24, such as an Evolved Packet Core (EPC) network or Next Generation Core (NGC) network. In the example shown, the core network 24 includes a serving gateway (SGW) 26, a packet data network gateway (PGW) 28, a mobility management entity (MME) 30, a home subscriber server (HSS) 32, and an element management system (EMS) 34, although other arrangements are possible as well.

In an example implementation, without limitation, each access node could have an interface with the SGW 26, the SGW 26 could have an interface with the PGW 28, and the PGW 28 could provide connectivity with a transport network 36. Further, each access node could have an interface with the MME 30, and the MME 30 could have an interface with the SGW 26, so that the MME 30 could coordinate setup of bearers for UEs to enable the UEs to engage in packet-data communication via 4G and 5G. Alternatively, just the 4G eNB 14 might have an interface with the MME 30 and may function as an anchor for signaling with the MIME 30 both for 4G service and for EN-DC service.

Still further, the HSS 32 could store or have access to UE profile records, which could specify service-subscription plans, UE configurations, and/or other such UE capability information, such as whether a UE is EN-DC capable for instance. And the EMS 34 could operate as a central repository of operational data for the wireless communication network and to control and manage operation of various network elements such as the access nodes.

FIG. 1 also illustrates multiple example UEs 38 that may from time to time be within coverage of the 4G eNB 14 and/or the 5G gNB 16. Each of these UEs may be equipped with a 4G LTE radio and/or a 5G NR radio, and may include associated circuitry and logic that enables the UE to engage in 4G LTE service and/or 5G NR service, and perhaps also EN-DC service. Further, the 4G eNB 14 and 5G gNB 16 could be configured to serve multiple such UEs at once and to support providing EN-DC service.

Upon entering into coverage of cell site 12, a representative such UE could initially scan for 4G coverage and could discover threshold strong coverage of the 4G eNB 14 on 4G carrier 18, and the UE could then responsively engage in random access and RRC signaling with the 4G eNB 14 to establish a 4G connection between the UE and the 4G eNB 14 on that 4G carrier 18. Further, the 4G eNB 14 could establish in data storage a context record for the UE indicating the UE's connection state, including for instance an indication of the 4G carrier 18 on which the UE is connected with the 4G eNB 14. And the 4G eNB 14 could report this status to the EMS 34.

Once the UE is connected with the 4G eNB 14, if the UE is not already registered with the core network, the UE could then transmit to the 4G eNB 14 an attach request message, which the 4G eNB 14 could forward to the MME 30 for processing. And upon authenticating and authorizing the UE for service, the MME 30 and 4G eNB 14 could coordinate setup for the UE of at least one user-plane bearer. For instance, the MME 30 could engage in signaling with the 4G eNB 14 and the SGW 26 to coordinate setup for the UE of an S1-U packet tunnel between the 4G eNB 14 and the SGW 26, and the SGW 26 could responsively engage in signaling with the PGW 28 to coordinate setup for the UE of an associated S5 packet tunnel between the SGW 26 and the PGW 28. Further, the 4G eNB 14 could engage in signaling with the UE to establish for the UE an associated data radio bearer (DRB).

Once the UE is connected with the 4G eNB 14 and registered with core network, the 4G eNB 14 could then serve the UE with wireless packet-data communications as noted above. For instance, when the 4G eNB 14 receives data for delivery to the UE, the 4G eNB 14 could coordinate transmission of that data from the 4G eNB 14 to the UE on downlink PRBs of the 4G carrier 18. And when the UE has data for delivery to the 4G eNB 14, the UE could transmit a scheduling request to the 4G eNB 14, and the 4G eNB 14 could coordinate transmission of that data from the UE to the 4G eNB 14 on uplink PRBs of the 4G carrier 18.

In addition, in relation to the UE's connection and/or attachment process or at another time, the 4G eNB 14 could also obtain capabilities data regarding the UE and could store the capabilities data in the UE context record for reference while serving the UE. For instance, during the attachment process, the MME 30 could obtain this data from the HSS 32 and could convey the data to the 4G eNB 14 for storage. Alternatively or additionally, the 4G eNB 14 could transmit to the UE an RRC message carrying a UE-capability enquiry, and the UE could respond to the 4G eNB 14 with a "UE capability information" information element (IE) specifying UE capabilities data. And this capabilities data could indicate whether the UE supports EN-DC.

If the UE is EN-DC capable and perhaps further if one or more other factors justify or trigger it, the 4G eNB 14 could then work to configure EN-DC service for the UE.

In line with the discussion above, for instance, the 4G eNB 14 could first transmit to the UE a B1 measurement object directing the UE to scan for 5G coverage. And the UE may provide the 4G eNB 14 with a measurement report indicating that the UE is within threshold strong coverage of 5G gNB 16 on 5G carrier 20 and/or 5G carrier 22. In the event the UE reports being within threshold strong 5G coverage on both carriers 20, 22, the 4G eNB 14 might select one of the those carriers to UE for a secondary 5G connection for the UE, perhaps selecting the one as to which the UE reported a higher coverage strength and/or selecting one based on one or more other factors. Or if the UE reports being within threshold strong 5G coverage of just one of carriers 20, 22, the 4G eNB 14 could decide that that one 5G carrier would be used for the UE's secondary 5G connection.

The 4G eNB 14 could then proceed to set up EN-DC service for the UE so that the UE can be served concurrently by the 4G eNB 14 on 4G carrier 18 and the 5G gNB 16 on the determined 5G carrier. (And note here that the service by each access node could refer to service on a primary component carrier of the UE's connection with the access node, in the event carrier-aggregation is involved.)

For instance, the 4G eNB 14, operating as MN, could first engage in process to add for the UE a 5G connection with the 5G gNB 16 on the determined 5G carrier, such as by transmitting to the 5G gNB 16 an SN-Addition request to cause the 5G gNB to allocate resources for that 5G connection, receiving an SN-Addition-Request acknowledge message from the 5G gNB 16, and engaging in associated RRC signaling with the UE, in response to which the UE could then access and complete establishment of the 5G connection with the 5G gNB 16 on the determined 5G carrier.

Further, in line with the discussion above, the 4G eNB 14 could engage in signaling to establish bearer connectivity for the UE via the 5G gNB 16. For instance, the 4G eNB 14 could engage in signaling with the MME 30 and the 5G gNB 16 to arrange for transfer of the UE's S1-U tunnel from being between the SGW 26 and the 4G eNB 14 to instead being between the SGW 26 and the 5G gNB 16.

Still further, the 4G eNB 14 could update the UE's context record to indicate that the UE is now EN-DC-connected, having the 4G connection with the 4G eNB 14 on 4G carrier 18 and having the 5G connection with the 5G gNB on the determined carrier, among possibly other information. And the 4G eNB 14 could report this connection status to the EMS 34 as well.

In addition, the 4G eNB 14, as MN, could impose use of a particular split ratio as discussed above, defining what portion of the UE's data flow will be carried on the UE's 4G connection between the UE and the 4G eNB 14 versus what portion of the UE's data flow will be carried on the UE's 5G connection between the UE and the 5G gNB 16. For instance, the 4G eNB 14 could engage in signaling with the 5G gNB 16 to direct and thus cause the 5G gNB 16 to apply the split ratio for downlink transmissions to the UE, and the 4G eNB 14 could engage in signaling with the UE to direct and thus cause the UE to apply the split for uplink transmissions from the UE. Alternatively, as to the 5G gNB 16 and/or the UE, the split ratio could be predefined and there may be no need for such signaling from the 4G eNB 14.

With EN-DC set up in this or another manner for the UE, the 4G eNB 14 and 5G gNB 16 could then provide the UE with EN-DC service, concurrently serving the UE over their respective connections with the UE as discussed above. Namely, as each access node receives data that it will transmit over its respective air interface to the UE, the access node could buffer that data, allocate downlink PRBs of the access node's respective air interface, and transmit the buffered data to the UE in the allocated downlink PRBs. And as the UE has data for transmission respectively to each access node, the UE could buffer the data and send to the access node a scheduling request, the access node could allocate uplink PRBs of the access node's respective air-interface if and when available, and the UE could transmit the buffered data to the access node in the allocated uplink PRBs.

In the example arrangement, the 4G eNB 14 may serve multiple such UEs 38 concurrently on 4G carrier 18, including perhaps multiple UEs having just standalone 4G connectivity with the 4G eNB 14 on carrier 18 and multiple UEs having EN-DC service including a primary 4G connection with the 4G eNB 14 on carrier 18 and a secondary 5G connection with the 5G gNB 16 or another 5G access node. In particular, numerous UEs may connect with the 4G eNB 14 on carrier 18 as noted above, and the 4G eNB 14 may set up EN-DC service for some of those UEs and possibly not for others.

Further, of the UEs that are connected with the 4G eNB 14 on 4G carrier 18 and have a secondary 5G connection for EN-DC service, some of the UEs may have their secondary 5G connection on the relatively narrow 5G carrier 20, while others may have their secondary 5G connection on the relatively wide 5G carrier 22. This distribution of the UEs' secondary connections among the 5G carriers 20, 22 could be a result of one or more factors in the 5G-carrier selection process, such as individual the UEs discovering and reporting stronger coverage on 5G carrier or another, among other possibilities.

As noted above, with a given split ratio for data flow between 4G and 5G, if a UE is served on a relatively wide secondary 5G carrier, the UE's total data flow on the UE's 4G connection may end up being relatively high. Therefore, in the present example, if a great portion of EN-DC-connected UEs that are connected with the 4G eNB 14 on 4G carrier 18 each have their secondary 5G connection on the wider 5G carrier 22, then the aggregate associated data load on the 4G carrier 18 may be relatively high. And high aggregate data load on the 4G carrier 18 could ultimately pose issues for the 4G eNB 14 timely scheduling of communications on that carrier.

To help address this issue in this example, in line with the discussion above, a computing system could monitor the distribution of the such EN-DC-connected UEs' secondary 5G connections between the relatively narrow 5G carrier 20 and the relatively wide 5G carrier 22. And based on the monitoring, the computing system could determine that at least a predefined threshold high portion of those UEs have their secondary connection on the relatively wide 5G carrier 22 and, responsive to at least that determination, could take action to help control load on the 4G carrier 18.

For instance, the computing system could determine that a majority of such UEs have their secondary connection on 5G carrier 22 rather than on 5G carrier 20 and, based at least on that determination, could take the load-control action. Further, the extent of load control could be proportional to or otherwise based on what portion of the UEs have their secondary connection on the 5G carrier 22. For instance, as more of the UEs have their secondary connection on 5G carrier 22 rather than 5G carrier 20, the computing system could impose more stringent measures for controlling load on the 4G carrier 18.

Alternatively, the computing system could monitor what portion of the EN-DC-connected UEs' secondary 5G connections have threshold wide frequency bandwidth, such as what portion of the UEs' secondary 5G connections are each on a carrier that is at a predefined wide frequency bandwidth such as at least 200 MHz wide for instance, or are each on a carrier that is at least predefined wider than another candidate 5G carrier, such as being at least 5× or 10× wider than another such carrier for instance. And based on that monitoring, the computing system could determine that at least a predefined threshold high portion of the UEs' secondary 5G connections have threshold wide frequency bandwidth, and, responsive to at least that determination, the computing system could take action to help control load on the 4G carrier 18.

As noted above, the action taken to control load on the 4G carrier 18 could involve causing the 4G eNB 14 to impose a limit on use of the 4G carrier 18. And causing the 4G eNB 14 to impose the limit on use of the 4G carrier could involve causing the 4G eNB 14 to introduce or strengthen such a limit.

By way of example, the action could involve causing the 4G eNB 14 to introduce or strengthen a limit on maximum number of UEs that the 4G eNB 14 would allow to be connected with the 4G eNB 14 on carrier 18. If the 4G eNB 14 does not impose such a limit to start, the action could involve causing the 4G eNB 14 to start imposing such a limit. Whereas if the 4G eNB 14 already imposes such a limit, the action could involve causing the 4G eNB 14 to reduce the maximum number allowed so that the limit would be more stringent. The 4G eNB 14 imposing this limit could involve the 4G eNB 14 detecting when the maximum number of UEs are already connected with the 4G eNB on carrier 18 and, based on that detecting, blocking additional UE connections on carrier 18, among other possibilities.

Here, the maximum number of UEs could be set by engineering design to be a level that is deemed to help control load on carrier 18 to a desired degree. Further, as noted above, various different such maximum limits could be set depending on how many (e.g., what portion) of the EN-DC-connected UEs have their secondary connection on the relatively wide 5G carrier 22 rather than on the relatively narrow 5G carrier 20.

Further, as another example, the load-control action could involve causing the 4G eNB 14 to likewise introduce or strengthen a limit on application of one or more resource-intensive services on carrier 18. For instance, the action could involve causing the 4G eNB 14 to limit an extent of high-bit-rate communications such as streaming video or the like that would be carried on carrier 18, or limiting application of transmission-time-interval (TTI) bundling on carrier 18, among other possibilities.

In addition, the act of causing the 4G eNB 14 to impose such a limit could take various forms depending on where the computing system is implemented. For instance, if the computing system is implemented at the 4G eNB 14 (e.g., by a baseband processor of the 4G eNB 14), then the act of causing the 4G eNB 14 to impose the limit could involve the 4G eNB 14 programmatically configuring an operational setting according to which the 4G eNB 14 will then impose the limit. Whereas, if the computing system is implemented at the EMS 34 or elsewhere, then the act of causing the 4G eNB 14 to impose the limit could involve transmitting to the 4G eNB 14 a control signal to which the 4G eNB 14 is configured to respond by so programmatically configuring itself. Other arrangements are possible as well.

Note also that the above discussed evaluation of UE secondary connections could alternatively be predictive based on historical connection data. For example, based on an analysis of connection data collected over time, the computing system could establish trend data, possibly time of day based or otherwise, that establishes what percentage of EN-DC-connected UEs that have their primary 4G connection with the 4G eNB 14 on carrier 18 are likely to have their secondary 5G connection with the 5G gNB 16 on carrier 22 versus on carrier 20, or what percentage of such UEs' secondary connections are threshold wide. And based on that trend data, the computing system could predict that that percentage would presently apply, and the computing system could accordingly take action to control the load on carrier 18.

Figure 2:
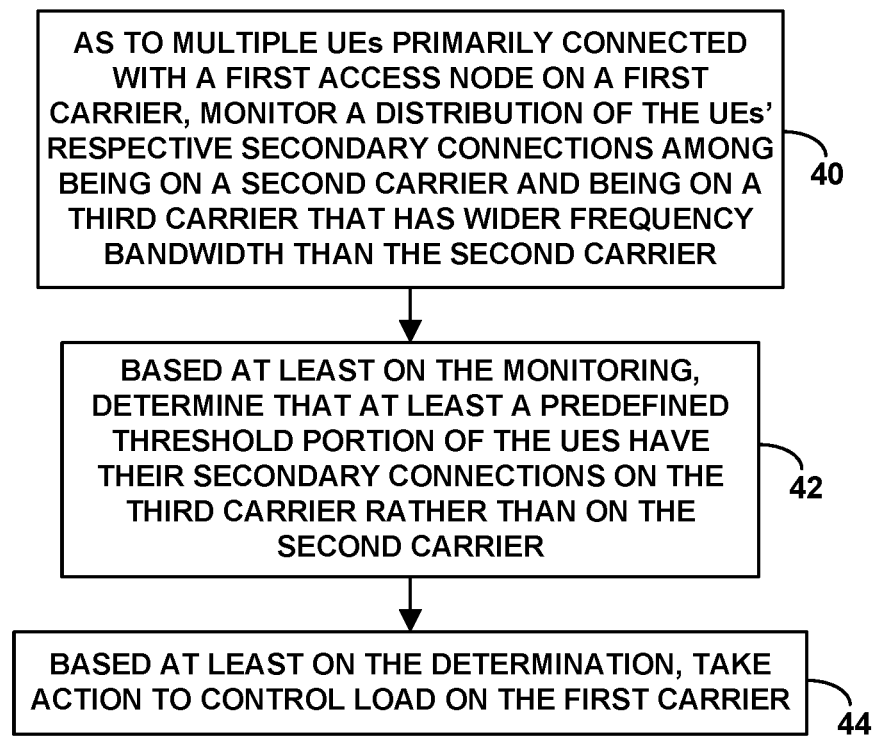
FIG. 2 is a flow chart depicting a method that could be carried out in accordance with the disclosure.

FIG. 2 is next a flow chart depicting a method that could be implemented in accordance with the present disclosure, to help control carrier load in a wireless communication system that supports multiple UEs each being primarily connected with a first access node on a first carrier and each have a respective secondary connection for dual-connectivity service (e.g., with all of the secondary connections being connections with a common second access node). As discussed above, this method could be carried out by one or more entities, such as by the first access node and/or by an EMS.

As shown in FIG. 2, at block 40, the method includes monitoring a distribution of the respective secondary connections of the UEs among being on a second carrier and being on a third carrier, wherein the third carrier has wider frequency bandwidth than the second carrier. At block 42, the method then includes, based at least on the monitoring, determining that at least a predefined threshold portion of the UEs have their secondary connections on the third carrier rather than on the second carrier. And at block 44, the method includes, based at least on the determining, taking action to control load on the first carrier.

In line with the discussion above, taking action to control load on the first carrier could involve causing the first access node to impose a limit on (i) maximum number of UEs that the first access node will allow to be concurrently connected with the first access node and/or (ii) application of a resource-intensive service on the first carrier. Further, imposing the limit could involve imposing the limit to a degree that is proportional to how many of the UEs have their secondary connections on the third carrier rather than on the second carrier.

In addition, as discussed above, the act of determining that at least the predefined threshold portion of the UEs have their secondary connections on the third carrier rather than on the second carrier could involve determining that a majority of the UEs have their second connections on the third carrier rather than on the second carrier.

Various other features discussed herein can be implemented in this context as well, and vice versa.

Figure 3:
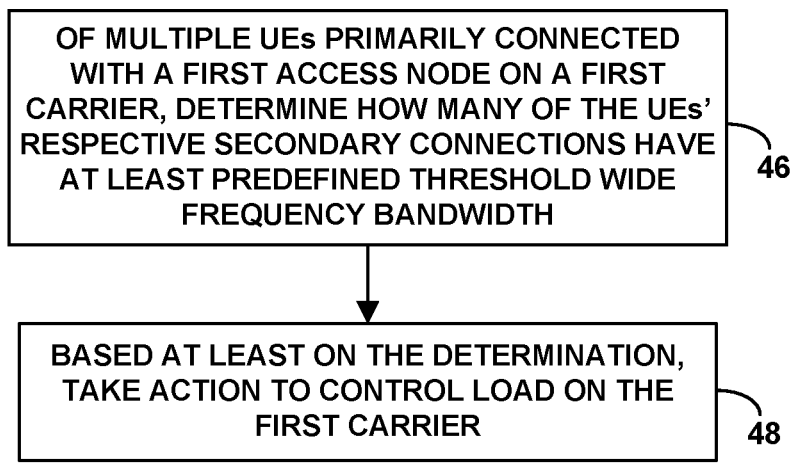
FIG. 3 is another flow chart depicting a method that could be carried out in accordance with the disclosure.

FIG. 3 is next another flow chart of a method that can be carried out in accordance with the present disclosure, to help control carrier load in a wireless communication system, the wireless communication system supporting each of multiple user equipment devices (UEs) being primarily connected with a first access node on a first carrier and each of the multiple UEs having a respective secondary connection for dual-connectivity service.

As shown in FIG. 3, at block 46, the method includes determining how many of the UEs' respective secondary connections have at least predefined threshold wide frequency bandwidth. And at block 48, the method includes, based at least on the determining of how many of the UEs' respective secondary connections have at least predefined threshold wide frequency bandwidth, taking action to control load on the first carrier.

Various other features discussed herein can be implemented in this context as well, and vice versa.

Figure 4:
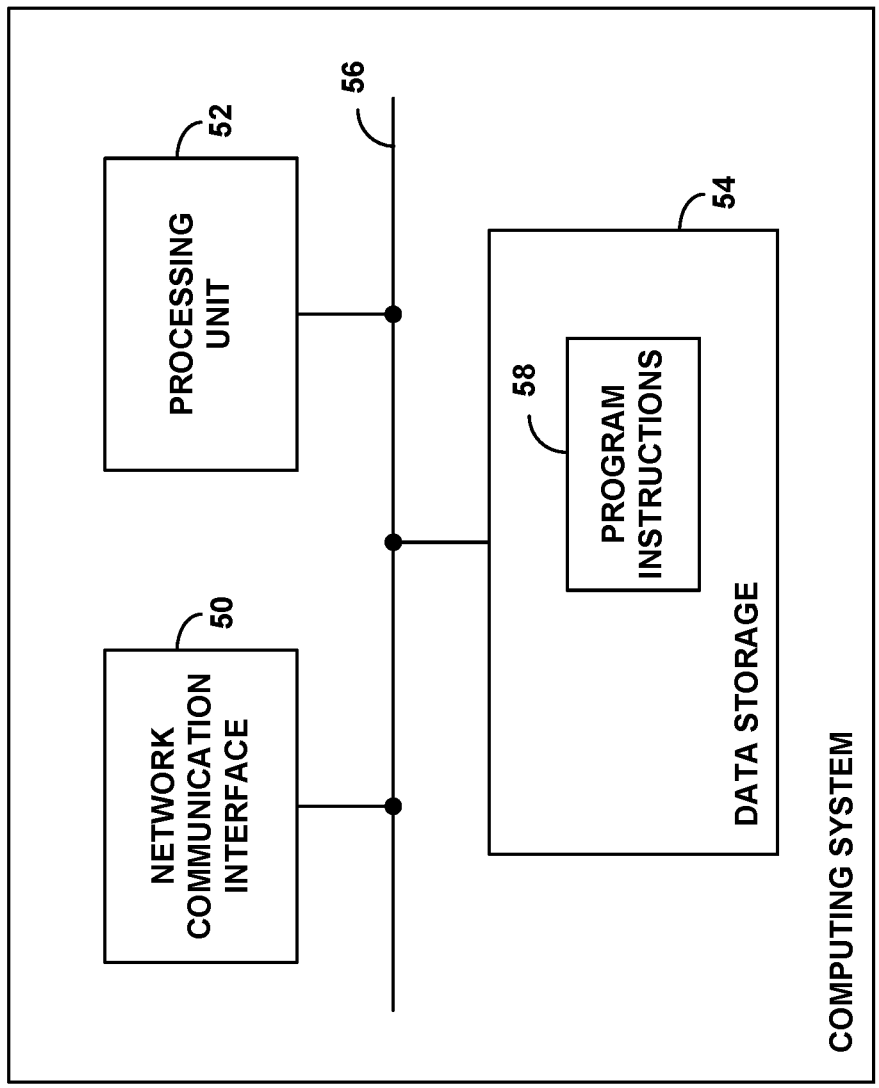
FIG. 4 is a simplified block diagram of an example computing system operable in accordance with the disclosure.

FIG. 4 is next a simplified block diagram of an example computing system that operable to control carrier load in a wireless communication system, the wireless communication system supporting each of multiple UEs being primarily connected with a first access node on a first carrier and each of the multiple UEs having a respective secondary connection for dual-connectivity service. As noted above, this computing system could be provided at the first access node or at an EMS, among other possibilities.

As shown in FIG. 4, the example computing system includes a network communication interface 50, a processing unit 52, and non-transitory data storage 54, all of which could be integrated together and/or interconnected by a system bus, network, or other connection mechanism 56.

The network communication interface 50 could comprise a physical network connector and associated communication logic (e.g., protocol stacks) to facilitate network communication with various other entities. The processing unit 52 could comprise one or more general purpose processors (e.g., microprocessors) and/or one or more special-purpose processors (e.g., application specific integrated circuits). And the non-transitory data storage 54 could comprise one or more volatile and/or non-volatile storage components (e.g., magnetic, optical, or flash storage).

As shown, the data storage 54 could then store program instructions 58, which could be executable by the processing unit 52 to cause the computing system to carry out various operations described herein, such as the operations depicted and described with respect to FIG. 2 and/or FIG. 3 for instance.

Various other features described above can be implemented in this context as well, and vice versa.

Figure 5:
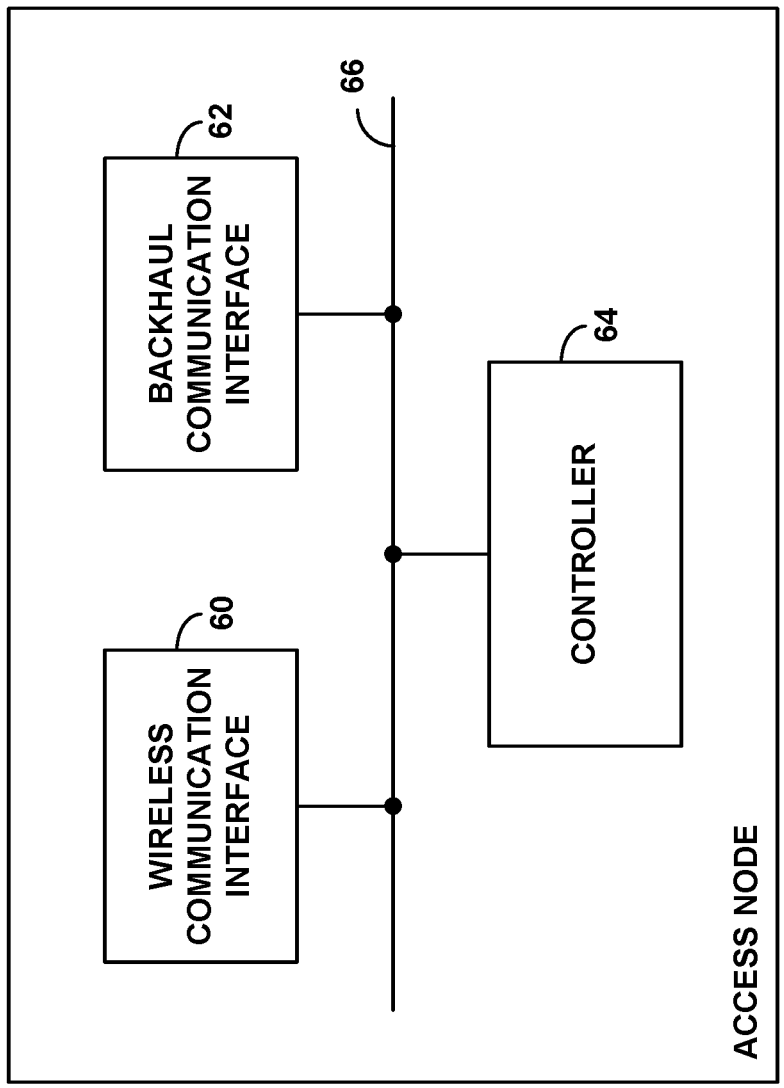
FIG. 5 is a simplified block diagram of an example access node operable in accordance with the disclosure.

FIG. 5 is next a simplified block diagram of an example access node that could operate in a wireless communication system such as that noted above for example, to carry out various features described herein. As shown, the example access node includes a wireless communication interface 60, a backhaul communication interface 62, and a controller 64, all of which could be integrated together and/or communicatively linked together by a system bus, network, or other connection mechanism 66.

In an example implementation, the wireless communication interface 60 could comprise an antenna structure, which could be tower mounted or could take other forms, and associated components such as a power amplifier and a wireless transceiver, so as to facilitate providing a coverage area defining an air interface and engaging air-interface communication on the air interface. And the backhaul communication interface 62 could comprise a wired or wireless interface, such as an Ethernet network communication interface, configured to support backhaul communication on a core network and with one or more other access nodes.

Further, the controller 64 (which might be provided by a baseband unit of the access node, for instance) could comprise one or more processing units (e.g., one or more general purpose processors and/or specialized processors) programmed to cause the access node to carry out various operations such as those discussed herein, including for example the operations of FIG. 2 and/or FIG. 3.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method to control carrier load in a wireless communication system, the wireless communication system supporting each of multiple user equipment devices (UEs) being primarily connected with a first access node on a first carrier and each of the multiple UEs having a respective secondary connection for dual-connectivity service, the method comprising:
   determining how many of the UEs' respective secondary connections have at least predefined threshold wide frequency bandwidth; and
   based at least on the determining of how many of the UEs' respective secondary connections have at least predefined threshold wide frequency bandwidth, taking action to control load on the first carrier.

2. The method of claim 1, wherein taking action to control load on the first carrier comprises causing the first access node to impose a limit on an item selected from the group consisting of (i) maximum number of UEs that the first access node will allow to be concurrently connected with the first access node and (ii) application of a resource-intensive service on the first carrier.

3. The method of claim 2, wherein imposing the limit comprises imposing the limit to a degree proportional to how many of the UEs have their secondary connections on a third carrier rather than on a secondary carrier.

4. The method of claim 1, wherein the secondary connections are all connections with a common second access node.

5. The method of claim 1, wherein the method is carried out by the first access node.

6. The method of claim 1, wherein the method is carried out by an element management system.

7. The method of claim 1, wherein the dual-connectivity service comprises EUTRA-NR Dual Connectivity (EN-DC).

8. A computing system operable to control carrier load in a wireless communication system, the wireless communication system supporting each of multiple user equipment devices (UEs) being primarily connected with a first access node on a first carrier and each of the multiple UEs having a respective secondary connection for dual-connectivity service, the computing system comprising:
   a processing unit;
   non-transitory data storage; and
   program instructions stored in the non-transitory data storage and executable by the processing unit to carry out operations including:
   determining how many of the UEs' respective secondary connections have at least predefined threshold wide frequency bandwidth; and
   based at least on the determining of how many of the UEs' respective secondary connections have at least predefined threshold wide frequency bandwidth, taking action to control load on the first carrier.

9. The computing system of claim 8, wherein taking action to control load on the first carrier comprises causing the first access node to impose a limit on an item selected from the group consisting of (i) maximum number of UEs that the first access node will allow to be concurrently connected with the first access node and (ii) application of a resource-intensive service on the first carrier.

10. The computing system of claim 8, wherein imposing the limit comprises imposing the limit to a degree proportional to how many of the UEs have their secondary connections on a third carrier rather than on a secondary carrier.

11. The computing system of claim 8, wherein the secondary connections are all connections with a common second access node.

12. The method of claim 8, wherein the dual-connectivity service comprises EUTRA-NR Dual Connectivity (EN-DC).

13. An first access node operable to control carrier load in a wireless communication system, the wireless communication system supporting each of multiple user equipment devices (UEs) being primarily connected with the first access node on a first carrier and each of the multiple UEs having a respective secondary connection for dual-connectivity service, the first access node comprising:
   a wireless communication interface;
   a backhaul communication interface; and
   a controller,
   wherein the controller is configured to determine how many of the UEs' respective secondary connections have at least predefined threshold wide frequency bandwidth, and
   wherein the controller is configured to, based at least on the determining of how many of the UEs' respective secondary connections have at least predefined threshold wide frequency bandwidth, take action to control load on the first carrier.

14. The first access node of claim 13, wherein the controller comprises one or more processing units programmed to cause the first access node to carry out the determining and the taking action.

15. The first access node of claim 13, wherein the controller is provided by a baseband unit of the first access node.

16. The first access node of claim 13, wherein taking action to control load on the first carrier comprises causing the first access node to impose a limit on an item selected from the group consisting of (i) maximum number of UEs that the first access node will allow to be concurrently connected with the first access node and (ii) application of a resource-intensive service on the first carrier.

17. The first access node of claim 13, wherein imposing the limit comprises imposing the limit to a degree proportional to how many of the UEs have their secondary connections on a third carrier rather than on a secondary carrier.

18. The first access node of claim 13, wherein the secondary connections are all connections with a common second access node.

19. The first access node of claim 13, wherein the dual-connectivity service comprises EUTRA-NR Dual Connectivity (EN-DC).

* * * * *